United States Patent
Billmers et al.

(10) Patent No.: US 7,561,255 B1
(45) Date of Patent: Jul. 14, 2009

(54) SYSTEM FOR VIEWING OBJECTS AT A FIRE SCENE AND METHOD OF USE

(76) Inventors: Richard I. Billmers, 4 Tanglewood Dr., Langhorne, PA (US) 19047; Elizabeth J. Billmers, 4 Tanglewood Dr., Langhorne, PA (US) 19047; Vincent M. Contarino, 12038 Taos Trail, Lusby, MD (US) 20657; Rudolph Lucente, 214 N. Main St., North Wales, PA (US) 19454; Mary E. Ludwig, 6 Wenark Dr. Apt. #12, Newark, DE (US) 19713

( * ) Notice: Subject to any disclaimer, the term of this patent is extended or adjusted under 35 U.S.C. 154(b) by 803 days.

(21) Appl. No.: 10/818,148

(22) Filed: Apr. 5, 2004

Related U.S. Application Data

(63) Continuation-in-part of application No. 10/417,550, filed on Apr. 17, 2003, now Pat. No. 6,724,467.

(60) Provisional application No. 60/373,853, filed on Apr. 19, 2002.

(51) Int. Cl.
*G01C 3/08* (2006.01)

(52) U.S. Cl. .................. 356/5.04; 356/5.01
(58) Field of Classification Search .......... 356/4.01, 356/4.03, 4.07, 5.02, 5.03, 5.04, 5.11, 5.15; 348/31, 164, 165; 250/330, 334, 370.08, 250/316.1, 338.1
See application file for complete search history.

(56) References Cited

U.S. PATENT DOCUMENTS

| | | | | |
|---|---|---|---|---|
| 3,305,633 | A | * | 2/1967 | Chernoch .................... 348/31 |
| 3,689,156 | A | | 9/1972 | Kerpchan |
| 4,129,780 | A | | 12/1978 | Laughlin |
| 4,501,470 | A | * | 2/1985 | Yeh ............................ 359/887 |
| 4,508,448 | A | | 4/1985 | Scholdstrom et al. |
| 5,243,541 | A | | 9/1993 | Ulich |
| 5,270,780 | A | | 12/1993 | Moran et al. |
| 5,434,612 | A | * | 7/1995 | Nettleton et al. ............. 348/31 |
| 5,453,618 | A | * | 9/1995 | Sutton et al. ................ 250/334 |
| 5,534,993 | A | | 7/1996 | Ball et al. |
| 5,682,035 | A | * | 10/1997 | Gallagher et al. ........... 250/332 |
| 5,694,203 | A | * | 12/1997 | Ogawa ....................... 356/5.04 |
| 5,719,567 | A | * | 2/1998 | Norris ........................ 340/953 |
| 5,822,047 | A | | 10/1998 | Contarino |
| 5,847,394 | A | * | 12/1998 | Alfano et al. ............. 250/341.8 |
| 6,414,746 | B1 | * | 7/2002 | Stettner et al. ............. 356/4.01 |
| 6,476,391 | B1 | * | 11/2002 | Zhang ........................ 250/330 |
| 2002/0005942 | A1 | * | 1/2002 | Perry ........................ 356/5.04 |
| 2002/0118352 | A1 | * | 8/2002 | Ohzu et al. ................ 356/5.04 |
| 2004/0239912 | A1 | * | 12/2004 | Correia Da Silva Vilar et al. ........................ 356/4.01 |

* cited by examiner

*Primary Examiner*—Isam Alsomiri
(74) *Attorney, Agent, or Firm*—Ted Masters

(57) ABSTRACT

A system and method for viewing objects at a fire scene allows fire fighters to view objects, including persons, in a smoke and fire filled environment. The present invention utilizes two different techniques to discriminate reflections from an object from scattered reflections from smoke and fire. In one embodiment of the invention, the coherent nature of laser light is employed to pick out objects. Another embodiment of the invention utilizes a time-gated approach to select reflections from objects which are located a specific distance from the laser transmitter.

4 Claims, 3 Drawing Sheets

SYSTEM FOR VIEWING OBJECTS AT A FIRE SCENE AND METHOD OF USE

CROSS REFERENCE TO RELATED APPLICATION

This application is a Continuation in Part of U.S. application Ser. No. 10/417,550 filed Apr. 17, 2003 (now U.S. Pat. No. 6,724,467), which is included herein by reference, and which claims the filing priority of U.S. provisional application No. 60/373,853 filed Apr. 19, 2002.

TECHNICAL FIELD

The present invention pertains generally to fire fighting, and more particularly to an imaging system and method which allows fire fighting personnel to clearly view objects in a smoke and fire filled fire environment.

BACKGROUND OF THE INVENTION

Smoke and fire make it difficult and sometimes impossible for fire fighting personnel to view a fire scene. As such, living victims can be overlooked, and dangerous surroundings such as obstructions, weakened structures, open floors, and stairs can present an extreme personnel hazard. The present invention comprises an imaging system that allows fire-fighting personnel to view images through the smoke and fire.

There are several drawbacks to even the most modern and sophisticated of thermal imaging systems. First and foremost is that the intense heat from a fire obscures any thermal signature that may be behind the flame front. Thus a baby or another firefighter may not be saved because the firefighter scanning the room didn't see them. Second is that objects without a thermal signature such as downed electrical cables or fallen/damaged structural elements are virtually invisible and thus may easily be overlooked by the firefighter hurrying to save someone's life. Finally, the detected 8,000 to 14,000 nanometer radiation does not penetrate through glass or water. For this reason a thermal imaging system cannot be used remotely from outside of the building or structure. Additionally, the thermal bloom from a fire renders thermal imaging systems virtually useless for objects behind the flames. Furthermore, these systems cannot see through glass or water and only allow the firefighter to see objects with a thermal signature such as the fire and the victim but all other obstacles or impediments that may cause the firefighter to be injured are not visible at all.

Combined LIDAR and RADAR technology is known in the art. For example, U.S. Pat. No. 5,822,047 is directed to a modulated LIDAR system, in which a laser for generating an optical carrier signal and a microwave generator for generating a coded microwave signal are provided. A modulator is further provided for modulating the carrier signal with the microwave signal, whereby a modulated signal is generated. A method of detecting a reflective surface is also disclosed, in which an optical carrier signal is generated, the carrier signal is modulated with a coded microwave signal, the modulated signal is reflected off of a reflective surface and the reflected signal is recovered.

SUMMARY OF THE INVENTION

The present invention comprises a man-portable, affordable, eye-safe imaging system which permits not only the visualization of victims, but also aspects of their surroundings (steps, obstructions, missing floors, fallen objects in path, etc) that are obscured by the glare and thermal bloom of the fire and the scattering of light by the smoke.

The system can be individually carried or mounted on a deployment vehicle (boom, ladder, or robot) and sent into the incident area where the display shows architectural features (stairs, walls, doorways, missing stairs), objects (furniture, fallen items), and persons (other emergency personnel, victims, pets). The system can also be used through a window from outside of a building or structure.

This system can also be used remotely from outside of the building or structure and will be used in conjunction with exiting thermal imaging systems to provide the firefighter with a much better understanding of the situation at hand. Additionally, military applications of the present invention include visualization of targets through flame and smoke obscured battlefields as well as fire fighting of vehicular and aircraft fires.

In accordance with a preferred embodiment of the invention, an imaging system for viewing objects at a fire scene includes a near-IR laser for generating a beam of light that may be directed at the fire scene. A microwave source modulates the laser output with a reference microwave signal, thereby resulting in an amplitude-modulated beam of light. An optical detector receives reflected light from the fire scene and generates a received microwave signal. A filter is disposed between the optical detector and the fire scene to remove unwanted signals. The output of the optical detector is routed to a microwave receiver. The microwave receiver "beats' the received microwave signal from the optical detector with the reference microwave signal in a "homodyne' process, thereby producing a composite microwave signal that is routed to a display.

In accordance with an aspect of the invention, the laser generates light having a wave length of between 1,400 nanometers and 1,600 nanometers.

In accordance with another aspect of the invention, the beam of light has a width of about 20° to 30°.

In accordance with another aspect of the invention, the reference microwave signal has a frequency of between 10 megahertz and 5 gigahertz.

In accordance with another aspect of the invention, a frequency control provides for selectively varying the frequency of the reference microwave signal.

In accordance with another aspect of the invention, the frequency control is automatic and scans a band of microwave frequencies to arrive at an optimal fire scene display.

In accordance with another aspect of the invention, the filter has a width of ±0.05 nanometers.

In accordance with another preferred embodiment of the invention, an imaging system for viewing objects at a fire scene includes a laser for generating a beam of light that may be directed at the fire scene. A pulse generator generates a reference pulse that is used to trigger the laser thereby producing a pulsed beam of light. A delay generator is connected to the pulse generator and produces a delayed pulse. A gated optical detector receives reflected light from the fire scene through a filter. The gated optical detector also receives the delayed pulse from the delay generator, and produces a gated output, wherein the gated output contains reflections from a distance corresponding to the delayed pulse. A display displays the gated output.

In accordance with another aspect of the invention, the laser generating light has a wave length of between 1400 nanometers and 1600 nanometers.

In accordance with another aspect of the invention, the wave length is about 1500 nanometers.

In accordance with another aspect of the invention, the beam of light has a width of about 20° to 30°.

In accordance with another aspect of the invention, the filter has a width of ±0.05 nanometers.

In accordance with an aspect of the invention, the reference pulse has a pulse width of between about 1 and 3 nanoseconds.

In accordance with another aspect of the invention, a delay control is provided for selectively varying the time relationship between the reference pulse and the delayed pulse.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
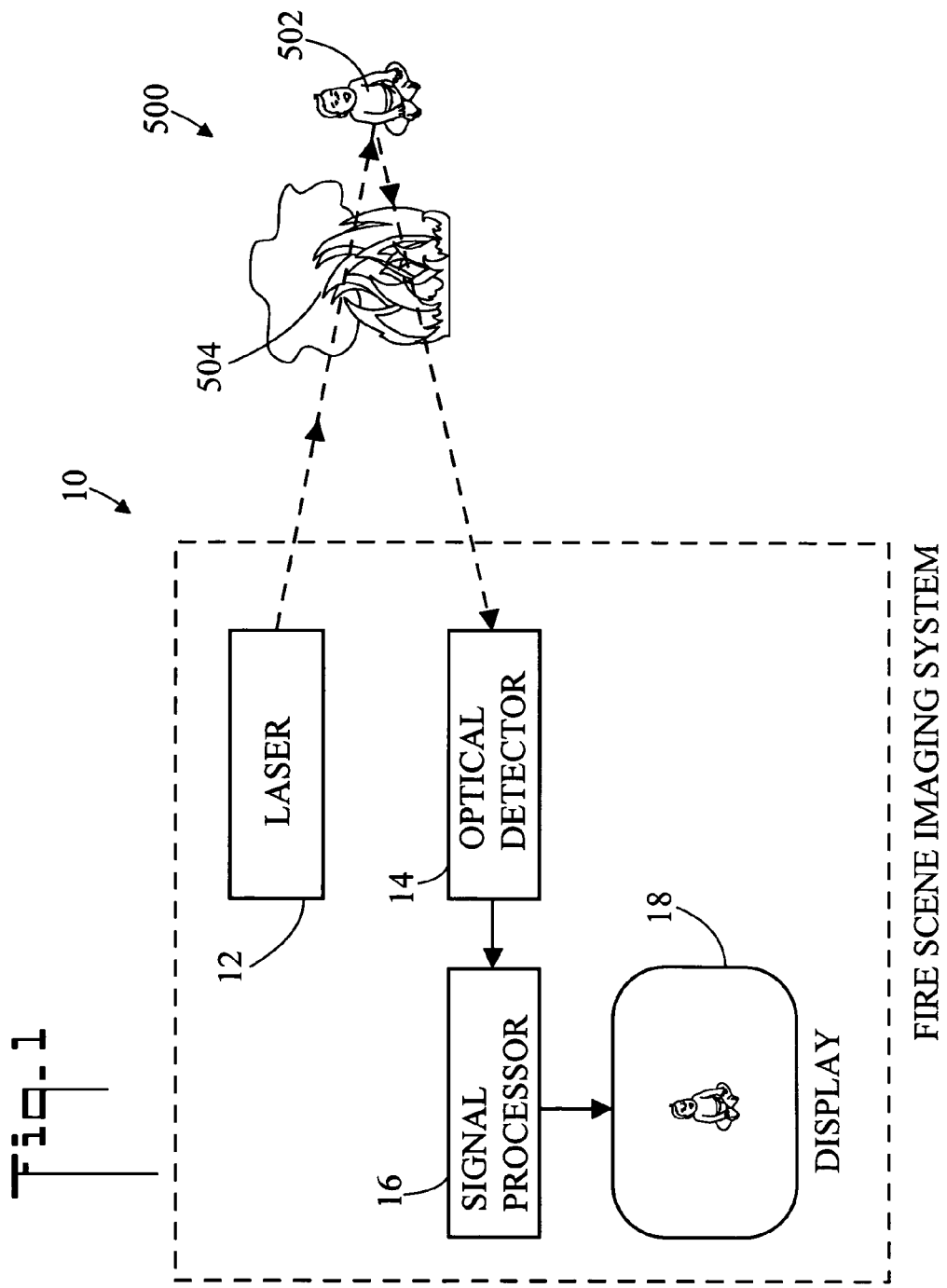
FIG. 1 is a simplified block diagram of an imaging system for viewing objects at a fire scene, in accordance with the present invention.

Referring initially to FIG. 1, there is illustrated a simplified block diagram of an imaging system for viewing objects 502 at a fire scene 500 in accordance with the present invention, generally designated as 10. Fire scene 500 includes both objects 502 of interest, such as victims and surrounding structure, and smoke and fire 504. System 10 includes an invisible light laser 12 which is directed at fire scene 500. Reflections from both the objects 502 and from the smoke and fire 504 are received by an optical detector 14. An output of optical detector 14 is processed by a signal processor 16, and directed to a display 18 for viewing by fire fighting personnel. The present invention utilizes two different techniques to discriminate reflections from an object from scattered reflections from smoke and fire.

Figure 2:
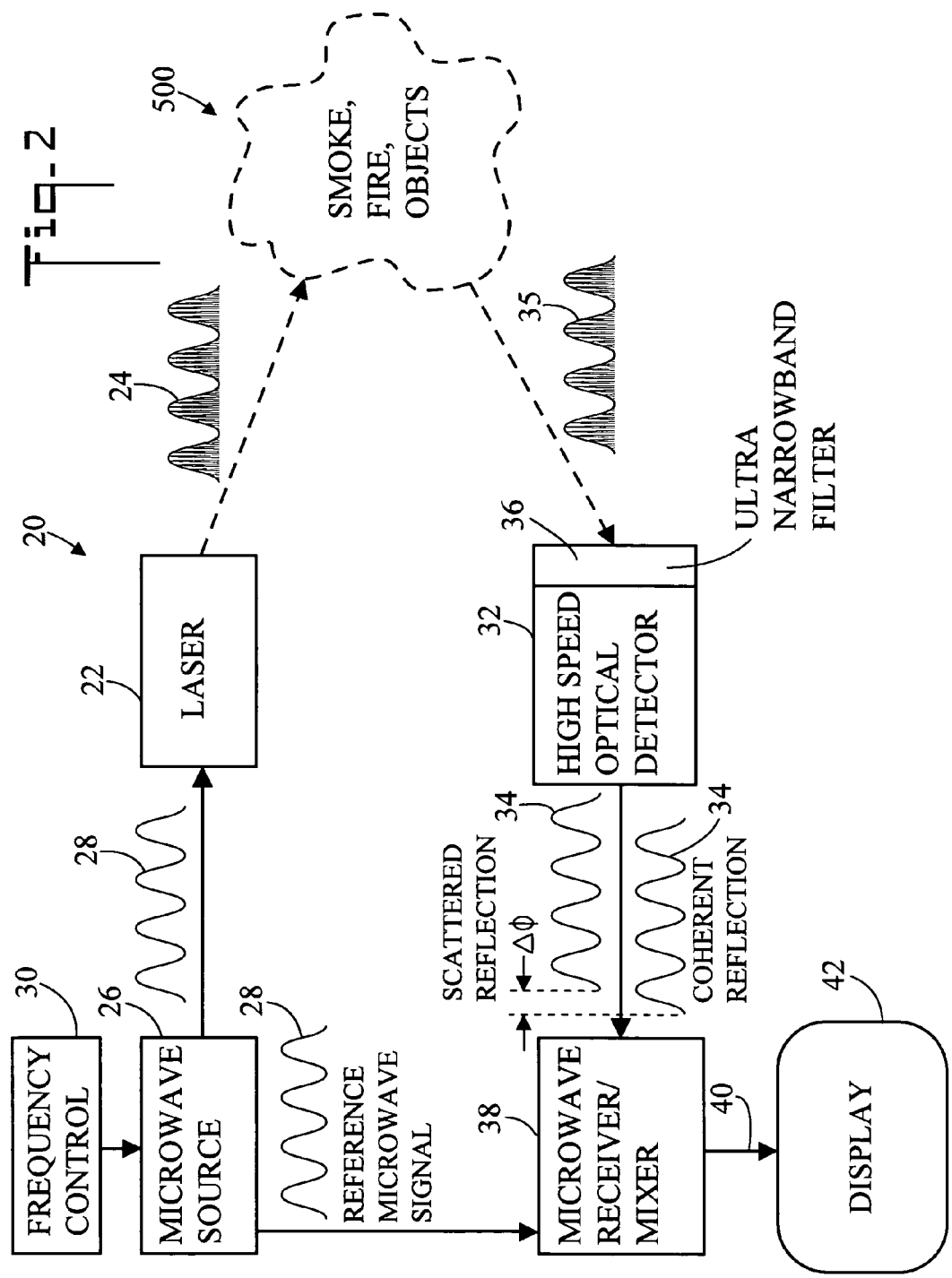
FIG. 2 is a detailed block diagram of a first embodiment of the invention.

Referring now to FIG. 2, there is illustrated a detailed block diagram of a first embodiment of the invention, generally designated as 20. In this coherent detection embodiment, the coherent nature of laser light is employed to distinguish reflections from objects from reflections from smoke and fire. Imaging system 20 includes a laser 22 that generates a beam of light 24 which may be directed at fire scene 500. In a preferred embodiment of the invention, laser 22 emits coherent light having a wave length of between 1,400 nanometers and 1,600 nanometers, with 1,500 nanometer being a useful value. This wave-length was selected for reasons of eye safety. At this wave-length, the most power output may be achieved with minimal risk of eye damage to either the fire fighters or persons being rescued. Also in an embodiment of the invention, beam of light 24 has a width of about 20° to 30°. This beam width produces an 8.5 foot wide field of view at a distance of 20 feet, and is useful in viewing a smoke and fire filled room. Laser 22 may operate in either a continuous wave (CW) or pulsed mode. Several companies make high-power laser diodes including Spectra-Diode Labs (SDL), Sharp, Mitsubishi and others.

System 20 further includes a microwave (radar frequency) source 26. Microwave source 26 generates a coherent reference microwave signal 28 which amplitude modulates laser 22 and therefore beam of light 24. In an embodiment of the invention, reference microwave signal 28 is imparted on the drive current of laser 22. As a result the optical frequency of laser 22 becomes modulated at frequency of the reference microwave signal 28. This light beam envelope is sent out into the highly scattering fire scene 500 medium.

In an embodiment of the invention, reference microwave signal 28 has a frequency of between 10 megahertz and 5 gigahertz. The requirement is that the modulation frequency be greater than the time required for light to travel one scattering length. The optimal frequency of reference microwave signal 28 depends upon the smoke density and the amount of light scattering at the fire scene 500. As the smoke density and scattering goes up, the reference microwave frequency 28 needs to be increased. In extreme smoke-filled environments, the scattering length can be as short as a foot or so which corresponds to modulation frequencies up to 1 GHz. Toward this end, a frequency control 30 is provided for selectively varying the frequency of reference microwave signal 28. By using frequency control 30, a fire fighter can adjust system 20 so that an optimal reflection is received from fire scene 500 and displayed on a display. In another embodiment of the invention, frequency control 30 is automatic, wherein the frequency of reference microwave signal 30 is automatically changed (such as through scanning) to produce an optimal fire scene 500 display.

System 20 further includes a high-speed optical detector 32 for receiving reflected light 35 from fire scene 500, and generating a received microwave signal 34. The optical frequency of laser 22 is removed from the reflected light 35 by high-speed optical detector 32 thereby leaving behind the original reference microwave signal 28, which has become the received microwave signal 34. Ultra high-speed optical detector 32 converts the invisible transmitted laser light (such as 1500 nanometer light) to electrical signals which can be gated to remove unwanted reflections from windows. In an embodiment of the invention, high-speed optical detector 32 is a high-speed camera system that is manufactured by companies such as New Focus and Intevac.

System 20 further includes an ultra narrowband filter 36 disposed between high-speed optical detector 32 and fire scene 500. Ultra narrowband filter 36 has a width of ±0.05 nanometers. Ultra narrowband filter 36 allows only reflected light having the laser wave-length ±0.05 nanometers to be received by high-speed optical detector 32. For example, for a laser 22 light output of 1500 nanometers, the high speed optical detector 32 would receive wave lengths of 1500±0.05 nanometers. The narrowness of filter 36 allows system 20 to "see" through the fire and smoke 504 by eliminating scattered radiation. Ultra narrowband filter 36 can be either transmissive or reflective. Ultra narrowband filter 36 passes only the transmitted laser light frequency to optical detector 32 and therefore filters out thermal "glare". Optical filters are manufactured by companies such as RL Associates, CVI laser, Andover Corp., Melles Griot, and Newport Optical.

System 20 further includes a microwave receiver 38 that is connected to high-speed optical detector 32, and receives received microwave signal 34. One function of microwave receiver 38 is to mix received microwave signal 34 with said reference microwave signal 28 to produce a composite microwave signal 40. Microwave receiver 38 performs a "homodyne" process to interfere the original reference microwave signal 28 sine wave with the received microwave signal 34 sine wave. The homodyne mixing process is essentially an interference effect in the electrical domain whereby the much more coherent target returns lead to constructive interference and thus much larger electrical signals then the less coherent scattered light. The homodyne process essentially comprises a phase sensitive addition of the two signals. This technique reduces background scattering from the fire and smoke 504. Background scattered radiation will be have been scattered multiple times, thus arriving at random times at high speed optical detector 32. This scattering causes a loss of coherence in the reflected signal. The reflection from a hard target will retain more of the original coherence and will therefore "beat" together much more efficiently in the homodyne process. It is important to note that the reference microwave signal 28 frequency of best background reduction is dependent on the amount of scattering and the scattering length. The more scattering there is, the shorter the scattering length and therefore the higher the frequency required to "wash" out the background. This is the reason for frequency control 30.

System 20 also includes a display 42 for displaying composite microwave signal 40. In an embodiment of the invention, display 20 is either a black and white or color 2D display, such as a TV-type monitor.

System 20 can either use CW mode in conjunction with time-gating techniques or pulse the coherent detection scheme directly to gain range information. While not shown in the illustration, display 42 would be connected to the radar detection. The high-speed optical detector 32 would be a camera so that the image information would be maintained and the radar detection would be performed for each pixel on the camera.

In terms of use, a method for viewing objects 502 at a fire scene 500, includes:

(a) providing an imaging system 20 for viewing objects 502 at a fire scene 500, system 20 including:

a laser 22 for generating a beam of light 24 which may be directed at fire scene 500;

a microwave source 26 which modulates beam of light 24 with a reference microwave signal 28;

a high speed optical detector 32 for receiving reflected light 35 from fire scene 500, and generating a received microwave signal 34;

an ultra narrowband filter 36 disposed between high speed optical detector 32 and fire scene 500;

a microwave receiver 38 connected to high speed optical detector 32, wherein received microwave signal 34 is mixed with reference microwave signal 28 to produce a composite microwave signal 40;

a display 42 for displaying composite microwave signal 40;

a frequency control 30 for selectively varying a frequency of reference microwave signal 28;

(b) causing laser 22 to be directed at fire scene 500; and, (c) using frequency control 30 to vary the frequency of reference microwave signal 28 so that a desired image is displayed on display 42.

The method further including:

in step (a), frequency control 30 being automatic, wherein the frequency of reference microwave signal 28 is automatically changed (scanned); and, in step (c), automatic frequency control 30 selecting a frequency of reference microwave signal 28 which produces an optimal display on display 42.

Figure 3:
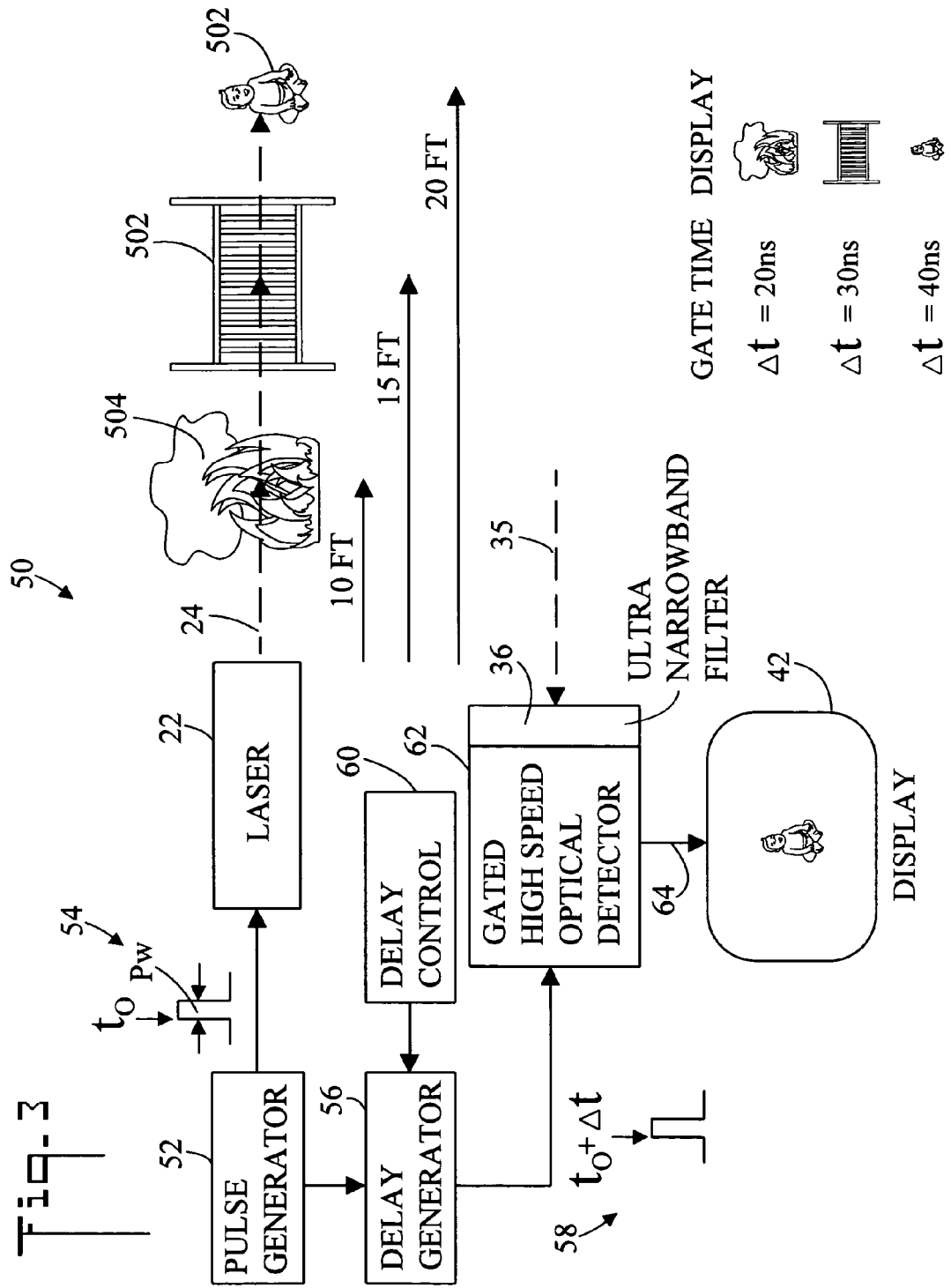
FIG. 3 is a detailed block diagram of a second embodiment of the invention.

FIG. 3 is a detailed block diagram of a second embodiment of the invention, generally designated as 50. This embodiment utilizes a time-gated approach to select reflections from objects which are located a specific distance from the laser transmitter. System 50 includes a a laser 22 for generating a beam of light 24 which may be directed at fire scene 500. A pulse generator 52 generates a reference pulse 54 which is used to trigger laser 22 thereby producing a pulsed beam of light 24. In an embodiment of the invention, reference pulse 54 has a pulse width Pw of between about 1 and 3 nanoseconds. The use of this very short time gate allows range resolution in feet. This is important in system 50 since the area of interest is usually in the range of 20 to 60 feet.

System 50 further includes a delay generator 56 connected to pulse generator, 52 wherein delay generator 56 produces a delayed pulse 58 that is delayed an amount $\Delta t$. That is if reference pulse 54 started at $t_o$, then delayed pulse 58 would start at $t_o+\Delta t$. System 50 also includes a delay control 60 for selectively varying the time relationship between reference pulse 54 and delayed pulse 58. That is, delay control 60 determines the value of $\Delta t$.

A gated high-speed optical detector 62 receives reflected light 35 from fire scene 500. An ultra narrowband filter 36 is disposed between high speed gated optical detector 62 and fire scene 500. Gated high speed optical detector 62 receives delayed pulse 58 from delay generator 56, and produces a gated output 64, wherein gated output 64 contains reflections from a distance corresponding to delayed pulse 58. A display displays gated output 64.

The explanation for time gating to generate range information is discussed blow. The laser diode 22 is pulsed by applying the reference pulse 54 generated by pulse generator 52. The resulting pulsed beam of light 24 will be reflected from the smoke and fire 504 and be detected as an exponential decay at high speed optical detector 62. Without gating the high speed optical detector, the return would be comprised of an exponential decay with a small "bump" on it from the target. By gating gated high-speed optical detector 62, at some time ($\Delta t$) after the laser pulse (that is after reference pulse 54), the unwanted scattering from the smoke and fire 504 is eliminated, and only the return from the target object 502 is detected. Since light travels at about 1 foot/nanosecond, the display 42 thus shows that the particular target can be selected by choosing the appropriate delay time ($\Delta t$). For example, to view objects 502 at a distance of 20 feet, a $\Delta t$ of 40 nanoseconds would be selected. This allows 20 nanoseconds for the light to reach the object 502, and another 20 nanoseconds for the light to return. At a particular time gate $t_o+\Delta t$, the image displayed on display 42 represents a 2D image with no depth information. To generate a 3D image with depth information, system 50 employs a variable time gate method. By sliding the time gate $t_o+\Delta t$ in time (that is by varying $\Delta t$), a series of 2D images will be constructed into a 3D image with range information derived from the delay time $\Delta t$ used to create it.

In another embodiment of system 50, the system can image the fire itself. This is achieved by time-gating system 50 on the fire and increasing the power output of laser transmitter 22 to allow the gated high-speed optical detector 62 to detect the reflection of the fire itself. Also, this technique will involve the narrowest of optical bandwidth filters and will be accomplished using a visible (390-780 nanometer) or near-infrared (780 nanometer-3 micron) laser transmitter 22.

A time-gated embodiment of the present invention must contain several characteristics for it to be useful as a tool in a fire scene.

First, the range resolution for this system must be on the order of a foot or less. This means that the turn-on and turn-off time for the imager must be significantly less than 1 ns in order to achieve the desired distance resolution. The current state-of-art short-wave infrared (SWIR) camera has a turn-on time of approximately 100 ns and a much longer turn-off time. In this embodiment of the present invention, the extremely fast gating is achieved by either switching the optical filter directly or epitaxially growing a monolithic device that contains both an optical filter and an extremely fast optical shutter. In either case, the filter or filter/modulator combination blocks the return photons from becoming incident on the camera until the proper DC voltage is applied. Upon application of this voltage, based upon the electro-optic in silicon or gallium arsenide, the material then transmits the photons to the camera until the voltage is once again turned off. Because small electrodes are "grown" into the substrate, the capacitance of a relatively thick material does not cause the device to slow down in the usual manner. To the best of our knowledge this is an extremely unique development of a time-gated, optically filtered imaging system particularly at 1550 nm.

Second, the optical filter used in this system must have a narrowband spectral linewidth with a wide acceptance angle. The filter must also be robust enough to withstand the rigors of the environment without requiring constant optical realignment. Fabry-Perot optical filters, while being narrow in spectral linewidth, do not have the wide acceptance angle necessary for the imaging application and also are extremely sensitive to vibrations and temperature fluctuations. A passive monolithic device is required for the system to be fully functional in a fire environment. In this embodiment of the present invention, we employ a specialty optical filter designed and processed to contain a narrow spectral linewidth and a wide acceptance angle. The filter contains a set of layers gallium arsenide and aluminum oxide arranged in "nano towers" whose height, thickness and spacing are specifically tailored to yield the proper linewidth, acceptance angle and holdoff for the desired wavelength of 1550 nm.

In terms of use, a method for viewing objects 502 at a fire scene 500, includes:

(a) providing an imaging system 50 for viewing objects 502 at a fire scene 500, including:

a laser 22 for generating a beam of light 24 which may be directed at fire scene 500;

a pulse generator 52 which generated a reference pulse which 54 is used to trigger laser 22 thereby producing a pulsed said beam of light 24;

a delay generator 56 connected to pulse generator 52, wherein delay generator 56 produces a delayed pulse 58;

a gated high speed optical detector 62 for receiving reflected light 35 from fire scene 500, high speed gated optical detector 62 receiving delayed pulse 58 from delay generator 56, and producing a gated output 64, wherein gated output 64 contains reflections from a distance corresponding to delayed pulse 58;

an ultra narrowband filter 36 disposed between high speed gated optical detector 62 and fire scene 500;

a delay control 60 for selectively varying a time relationship between reference pulse 54 and delayed pulse 58;

a display 42 for displaying gated output 64;

(b) causing laser 22 to be directed at fire scene 500; and, (c) using delay control 60 to vary the time relationship ($\Delta t$) between reference pulse 54 and delayed pulse 58 so that display 42 displays objects 502 which are at a desired distance from laser 22.

The method further including:

in step (a), increasing a power level of laser 22; and, in step (c), adjusting delay control 60 to correspond with a distance to flames.

The preferred embodiments of the invention described herein are exemplary and numerous modifications, variations, and rearrangements can be readily envisioned to achieve an equivalent result, all of which are intended to be embraced within the scope of the appended claims.

We claim:

1. An imaging system for viewing objects at a fire scene, comprising:

a laser for generating a beam of light which may be directed at the fire scene;

a pulse generator, said pulse generator generating a reference pulse which is used to trigger said laser thereby producing a pulsed said beam of light;

a delay generator connected to said pulse generator, wherein said delay generator produces a delayed pulse;

a delay control for selectively varying a time relationship between said reference pulse and said delayed pulse;

a gated optical detector for receiving reflected light from the fire scene, a filter disposed between said gated optical detector and the fire scene;

said gated optical detector receiving said delayed pulse from said delay generator and producing a gated output, wherein said gated output contains reflections from a distance corresponding to said delayed pulse;

a display for displaying said gated output;

said beam of light having a width of 20° to 30°.

2. An imaging system for viewing objects at a fire scene, comprising:

a laser for generating a beam of light which may be directed at the fire scene;

a pulse generator, said pulse generator generating a reference pulse which is used to trigger said laser thereby producing a pulsed said beam of light;

a delay generator connected to said pulse generator, wherein said delay generator produces a delayed pulse;

a delay control for selectively varying a time relationship between said reference pulse and said delayed pulse;

a gated optical detector for receiving reflected light from the fire scene, a filter disposed between said gated optical detector and the fire scene;

said gated optical detector receiving said delayed pulse from said delay generator and producing a gated output, wherein said gated output contains reflections from a distance corresponding to said delayed pulse;

a display for displaying said gated output;

said filter having a narrowband spectral linewidth with a wide acceptance angle;

said laser having a laser wavelength; and, said filter allowing only reflected light having said laser wavelength ±0.05 nanometers to be received by said gated optical detector.

3. An imaging system for viewing objects at a fire scene, comprising:

a laser for generating a beam of light which may be directed at the fire scene;

a pulse generator, said pulse generator generating a reference pulse which is used to trigger said laser thereby producing a pulsed said beam of light;

a delay generator connected to said pulse generator, wherein said delay generator produces a delayed pulse;

a delay control for selectively varying a time relationship between said reference pulse and said delayed pulse;

a gated optical detector for receiving reflected light from the fire scene, a filter disposed between said gated optical detector and the fire scene;

said gated optical detector receiving said delayed pulse from said delay generator and producing a gated output, wherein said gated output contains reflections from a distance corresponding to said delayed pulse;

a display for displaying said gated output;

said laser generating light having a wave length of between 1400 nanometers and 1600 nanometers;

said beam of light having a width of 20° to 30°;

said filter having a narrowband spectral linewidth with a wide acceptance angle;

said filter allowing only reflected light having said laser wavelength ±0.05 nanometers to be received by said gated optical detector; and, said reference pulse having a pulse width of between about 1 and 3 nanoseconds.

4. An imaging system for viewing objects at a fire scene, comprising:

a laser for generating a beam of light which may be directed at the fire scene;

said beam of light having a width of 20° to 30°;

a pulse generator, said pulse generator generating a reference pulse which is used to trigger said laser thereby producing a pulsed said beam of light;

a delay generator connected to said pulse generator, wherein said delay generator produces a delayed pulse;

a delay control for selectively varying a time relationship between said reference pulse and said delayed pulse;

a gated optical detector for receiving reflected light from the fire scene, a filter disposed between said gated optical detector and the fire scene, said filter having a narrowband spectral linewidth with a wide acceptance angle;

said gated optical detector receiving said delayed pulse from said delay generator and producing a gated output, wherein said gated output contains reflections from a distance corresponding to said delayed pulse; and, a display for displaying said gated output.

* * * * *